May 3, 1949.  W. BEGEROW  2,468,802
TRACING DEVICE

Filed June 9, 1945  2 Sheets-Sheet 1

INVENTOR.
Walter Begerow
BY
ATTORNEYS.

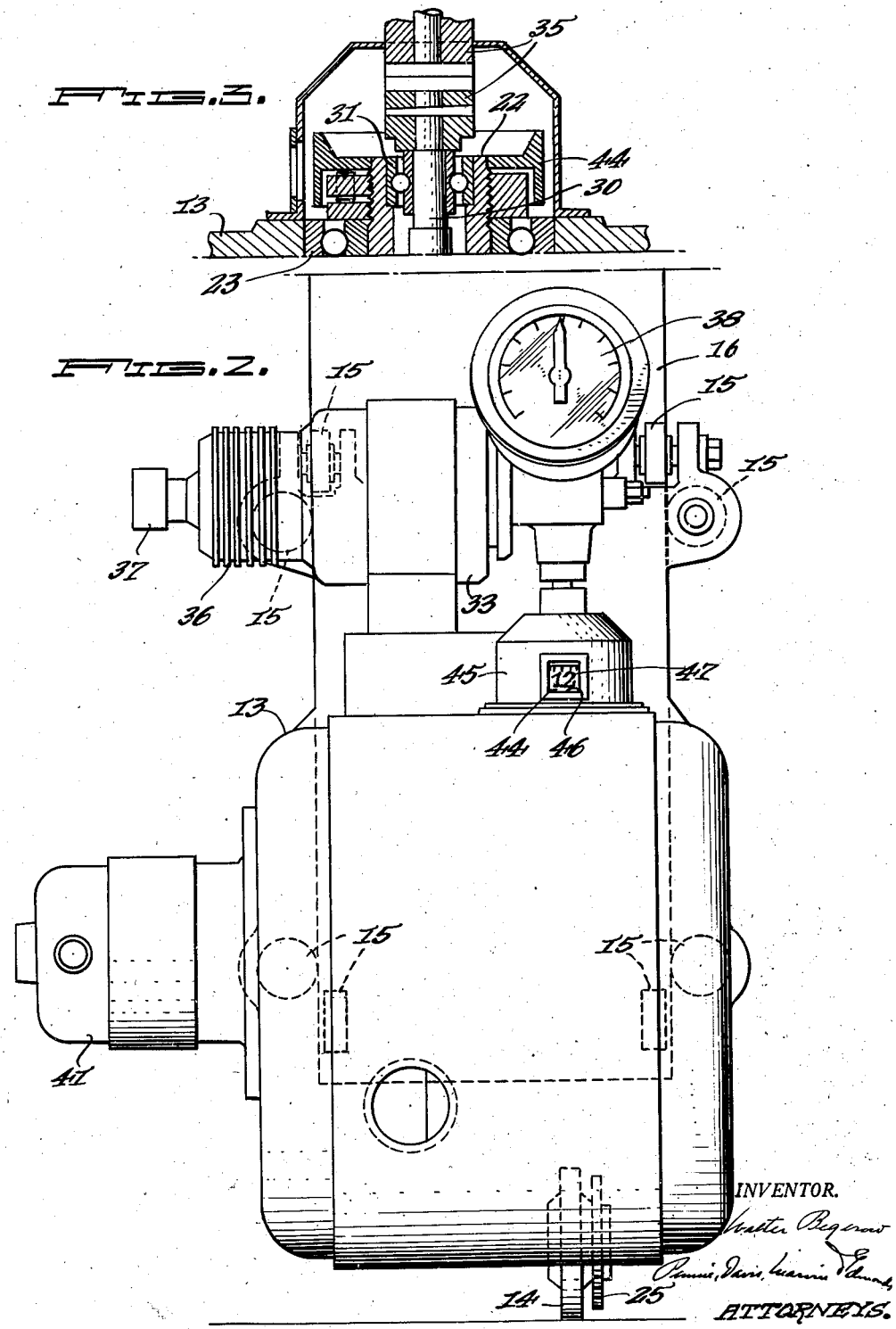

Patented May 3, 1949

2,468,802

UNITED STATES PATENT OFFICE 2,468,802

TRACING DEVICE

Walter Begerow, Wood-Ridge, N. J., assignor to Air Reduction Company, Incorporated, a corporation of New York Application June 9, 1945, Serial No. 598,544

6 Claims. (Cl. 250—41.5)

This invention relates to tracing devices for guiding the course of an instrumentality, such as a cutting or welding torch, in accordance with a drawing or pattern traced by the device. Tracing devices of this kind are commonly used on universal cutting or welding machines such as those of the folding pantograph type in which a gas cutting or welding torch is mounted on one part of a pantograph structure, such as the front bar of a folding parallelogram frame, and the tracing device is mounted on another part so that the torch is capable of universal movement in a plane and so that when the tracing device is caused to follow the outline of the drawing or pattern the torch will be guided accordingly.

One type of tracing device for use in this way comprises a power-driven traction wheel that rolls on the surface containing the drawing or pattern. The wheel is guided along the outline of the drawing or pattern and is steered about a vertical axis that passes through the point of traction. Power is supplied to the traction wheel from an electric motor through a vertical drive shaft and worm coaxial with the axis about which the traction wheel is turned when steering.

The traction wheel is usually steered by hand to cause it to follow the outline of the drawing or pattern. Recently, however, an electronic tracing device has been proposed in which the traction wheel is automatically steered and caused to follow the outline of the drawing or pattern. The tracing device has means for projecting a beam of light on the line forming the drawing and the light is reflected into a photoelectric cell. The variation in the amount of light received by the photo-electric cell if the traction wheel deviates too far from the line of the drawing causes the steering mechanism to steer the traction wheel back toward the line. Most of the additional mechanism required to produce the automatic steering of the traction wheel is located within a housing carried by the tracing device. To shield the portion of the drawing that is influencing the photo-electric cell from as much light as possible except that which is purposely projected onto it through the bottom of the housing, the bottom of the housing is made rather large in area and is positioned fairly close to the surface containing the drawing or pattern. This so obscures the traction wheel that its orientation, i. e. the direction in which it is headed, cannot be readily observed by the operator. This is a disadvantage since the traction wheel should of course be adjusted before the tracing operation is started so that it is oriented or headed substantially in the direction of the portion of the drawing on which it is resting at the time, otherwise the tracing device might get out of control of the automatic steering mechanism at the very beginning of the tracing operation.

According to the present invention a tracing device of the above described type, in which the traction wheel is so obscured that its orientation cannot be readily observed by the operator, has an indicator element at a location where it may be readily seen by the operator which will indicate to him the orientation of the traction wheel at all times.

A tracing device embodying the invention is illustrated in the accompanying drawing in which:

Fig. 2 is a front elevation thereof; and

Fig. 3 is a vertical section of that portion of the tracing device where the indicator element is located.

Figure 1:
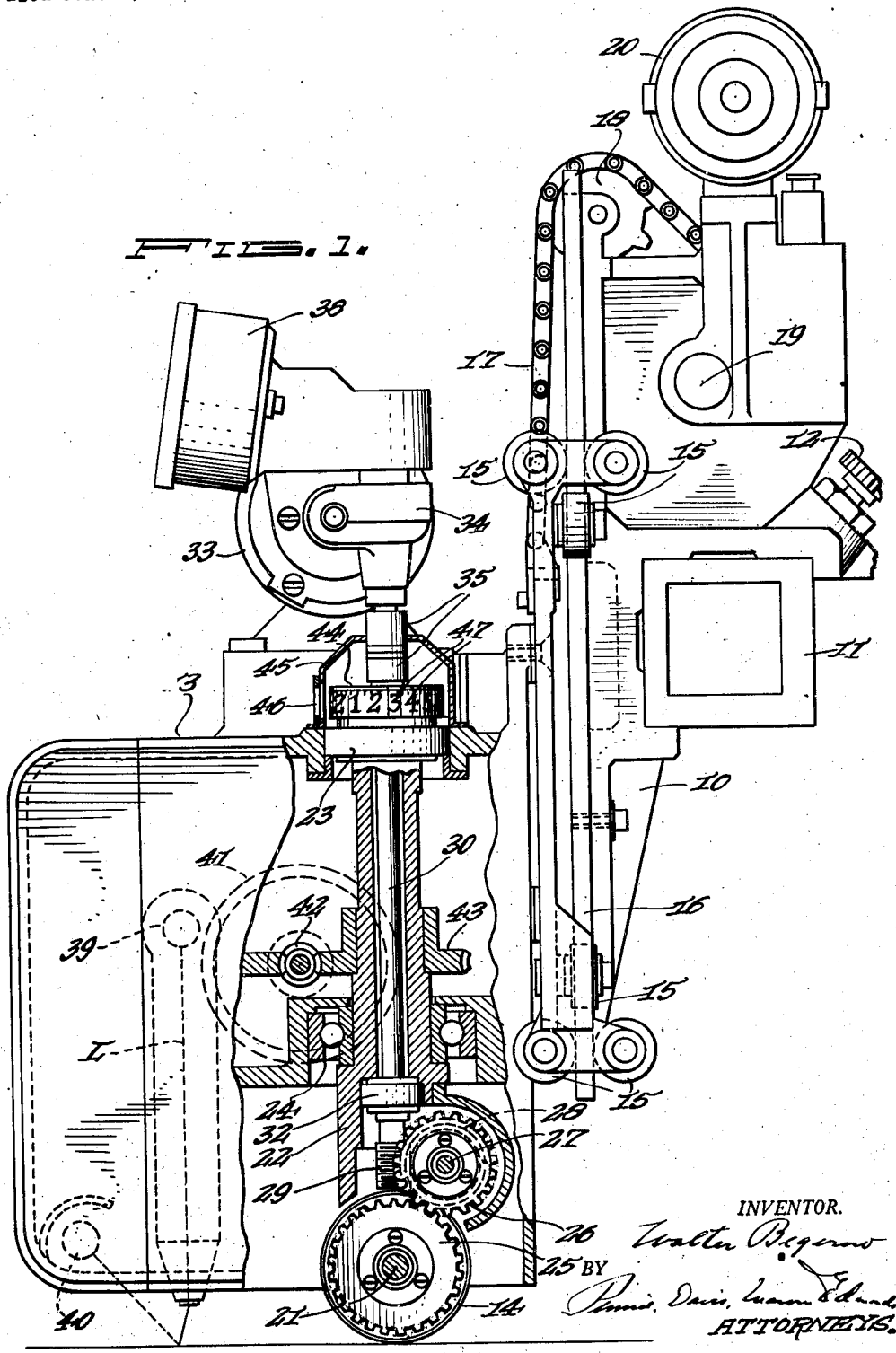
Fig. 1 is a side elevation, partly in vertical section, of the tracing device.

The tracing device is intended for use with various kinds of universal cutting or welding machines, but is shown in the drawings as equipped with a bracket 10 (Fig. 1) for clamping it to the front bar 11 of a conventional cutting machine of the folding parallelogram type. The bracket 10 is held in any set position along the bar 11 by a clamping screw 12.

The tracing device includes a housing 13 in which certain parts of the tracing device are located, as hereinafter described, and below which the power-driven traction wheel 14 projects. The housing 13 is mounted on the bracket 10 so as to be capable of vertical movement thereon and means are provided for moving the housing vertically to bring the traction wheel 14 into contact with the drawing to be traced and for raising it away from the drawing. The particular means for movably mounting the housing on the bracket 10, and the particular means for raising and lowering the housing, form no part of the present invention and a detail description thereof is not necessary for a full understanding of the invention. It is sufficient to note that at the back of the housing 13 there are guide rollers 15 which move up and down along the two opposite lateral edge portions of a guide rail or plate 16 rigidly secured to the bracket 10. A chain 17 connected to the upper end of the housing 13 passes around an idler sprocket 18 at the upper end of the bracket 10 and wraps around a sprocket (not shown) on a shaft 19, this sprocket being large enough in circumference to wrap up as much of the chain 17 as necessary for the full upward vertical movement of the housing 13. The sprocket on the shaft 19 is driven from an electric motor 20 through suitable reduction gearing that includes a worm of slow pitch that makes the gearing irreversible so that the housing 13 will be held in any position in which it stops. Any suitable means for providing a limited vertical movement of the housing 13 with respect to the bracket 10 may be employed.

The traction wheel 14 rotates on a horizontal shaft 21 (Fig. 1) which is carried by the lower end of a sleeve 22. This sleeve is rotatable about a vertical axis in a ball bearing 23 at the upper part of the housing 13 (see Fig. 3 for a cross-sectional showing of this ball bearing) and a similar ball bearing 24 (Fig. 1) in the lower part of the housing. The vertical axis about which the sleeve 22 is rotatable, passes through the point of traction of the traction wheel 14. A gear 25 is connected to one side of the traction wheel 14 (see also Fig. 2) and meshes with a driving pinion 26 mounted on a second horizontal shaft 27 carried by the sleeve 22. The pinion 26 rotates with a worm wheel 28, at the far side of the pinion as viewed in Fig. 1. This worm wheel meshes with a worm 29 carried by the lower end of a drive shaft 30 which extends upwardly through the sleeve 22. The drive shaft is rotatably mounted in the sleeve 22 by a ball bearing 31 at the upper end of the sleeve (Fig. 3) and a similar ball bearing 32 (Fig. 1) near the lower end of the sleeve, the drive shaft being mounted in the bearings so that the axis of the drive shaft coincides with the axis of rotation of the sleeve 22. It will be evident that rotation of the drive shaft 30 causes the worm 29 to drive the traction wheel through the worm wheel 28, pinion 26 and gear 25 secured to the traction wheel.

The drive shaft 30 is driven from an electric motor 33 supported on top of the housing 13 (see also Fig. 2). The motor is connected with the drive shaft through reduction gearing 34 and a coupling 35 (Fig. 1). The speed of the motor may be controlled by an adjustable centrifugal speed control governor 36 which may be adjusted by turning a knob 37 (Fig. 2). A tachometer 38 indicates the speed at which the traction wheel 14 moves along the drawing for any given setting of the speed control governor of the motor.

The tracing device as thus far described is of conventional type. Usually the sleeve, in whose lower end the traction wheel is mounted, is turned by hand to steer the traction wheel to cause it to propel the tracing device along the outline of the drawing. However, in the tracing device shown in the drawings the steering of the traction wheel is effected automatically. The specific means by which this is accomplished does not form part of the present invention and therefore need not be described in detail, it being sufficient to note that a beam of light represented by the line L (Fig. 1) from a light source 39 is projected through the bottom of the housing 13 onto the drawing line and is reflected back into a photo-electric cell represented at 40. Special drawings are used having a wide line, and the condition of equilibrium of the traction wheel is obtained when the bright spot of light on the drawing is one-half on the black line of the drawing and one-half on the white paper adjacent the line. If the bright spot of light moves toward the black line, the amount of light received by the photo-electric cell is decreased and the traction wheel is turned about the axis of the sleeve 22 in a direction to move the bright spot of light back toward the edge of the line. Conversely, if the bright spot of light moves away from the black line of the drawing, the amount of light reflected to the photo-electric cell increases and the traction wheel is steered in the opposite direction to restore the condition of equilibrium. The turning of the traction wheel about the axis of the sleeve 22 is effected by an electric motor 41 which drives a worm 42 (Fig. 1) meshing with a worm wheel 43 secured to the sleeve 22. The motor is controlled by the photo-electric cell, and since the motor turns the sleeve 22 in one direction or the other in accordance with the amount of light received by the photo-electric cell, it automatically steers the traction wheel and causes it to follow the outline of the drawing.

In order to insure satisfactory automatic steering of the traction wheel it is necessary to shield the drawing from excessive extraneous light that might be reflected into the photo-electric cell and thereby produce unwanted changes in the orientation of the traction wheel. For this reason, the housing 13, which houses most of the parts of the automatic steering mechanism, is so made that it has a broad bottom area which is positioned close to the drawing when the tracer is in operation. The housing itself is thus used to shut off from that portion of the drawing which is influencing the photo-electric cell all or most of the light except that which is purposely projected onto the drawing from the light source 39. This arrangement, however, has the disadvantage that the housing so obscures the traction wheel that the operator cannot see which way it is turned or oriented when starting the tracing device. To overcome this difficulty there is secured to the upper end of the sleeve 22, above the housing 13, an indicator element which is preferably made in the form of a cylinder or drum 44 coaxially mounted on the sleeve (Figs. 1 and 3). The cylinder 44 is enclosed by a casing 45 in the front portion of which there is provided a window 46 (Figs. 1 and 2) through which the side wall of the cylinder 44 may be seen. The cylinder 44 rotates with the sleeve 22 when the traction wheel is steered and thus the surface of the cylinder is thereby moved progressively by the window 46. Numerals and graduations 47 are provided on the outside surface of the cylinder 44, and by viewing them through the window, the operator can always tell at a glance in what direction the traction wheel is headed.

The numbering system used is preferably one which includes the numerals from 1 to 12 equally spaced around the cylinder in ascending order from left to right, as shown in Fig. 1, the numerals being so positioned on the cylinder that when the traction wheel is oriented straight ahead the numeral 12 will appear in the window 46. Thus, the numerals indicate to the operator the orientation of the traction wheel in much the same fashion that the direction of movement of an airplane or ship is designated by reference to the numerals of a clock. For example, if the numeral 12 appears at the window 46 the operator will know that the steering wheel is oriented straight ahead and that the tracing device, when placed in operation, will move directly away from the operator, i. e., toward the right as viewed in Fig. 1. If the numeral 6 is visible in the window 46 the operator will know that the traction wheel will move the tracing device toward him. If the numeral 3 appears in the window 46 the traction wheel is oriented in a direction to move the tracing device toward the right, and the appearance of the numeral 9 in the window indicates a position of the traction wheel that will move the tracing device toward the left. Other numerals similarly indicate the various other angular positions of the traction wheel.

Any other suitable type of markings on the indicator element or cylinder 44 may be employed which will inform the operator of the orientation of the traction wheel at any given time by the particular marking or markings visible through the window at such time. For instance, a series of arrows may be placed on the surface of the cylinder 44 in place of the numerals each of which, when visible through the window 46, would inform the operator of the orientation of the traction wheel by the direction in which that arrow points.

It will now be seen that the indicator element is located at a position where it can be readily seen by the operator, and even though the traction wheel is obscured by the housing 13, the operator can quickly determine the direction in which it is headed by noting which numeral or other marking is visible in the window. If the indicating device shows that the traction wheel is not headed in the direction of that portion of the drawing line on which it is resting, the operator can make the necessary adjustment of the traction wheel before the tracer is started.

The window 46 is made small enough to constitute a reference place by which the surface of the indicator cylinder or drum moves progressively when it turns with the sleeve 22 and which selects for the operator's observation one numeral or other marking that will inform him of the then position of the traction wheel, but some other type of reference place may be used. For instance, the reference place may be a stationary pointer or the like by which the numerals on the indicator cylinder move and which would select for the operator's observation one of the markings even if all or most of them were exposed to view. Various other changes may be made without departing from the invention as defined in the accompanying claims.

I claim:

1. In a tracing device having a traction wheel rotatable about a horizontal axle carried by the lower end of a sleeve that may be turned about a vertical axis to orient or steer the traction wheel, a motor-driven shaft extending through said sleeve and operatively connected to the traction wheel to drive the same, automatic means for turning the sleeve to steer the traction wheel, and a housing through which said sleeve and shaft extend and which houses at least part of said automatic means for turning the sleeve, said housing having such size and location that it so obscures the traction wheel that its orientation cannot be readily observed by the operator, the improvement which comprises an indicator element connected to and movable with the upper portion of the sleeve above said housing where it may be readily seen by the operator to indicate the orientation of the traction wheel at all times.

2. In a tracing device having a traction wheel rotatable about a horizontal axle carried by the lower end of a sleeve that may be turned about a vertical axis to orient or steer the traction wheel, a motor-driven shaft extending through said sleeve and operatively connected to the traction wheel to drive the same, means for automatically turning the sleeve about its vertical axis to steer the traction wheel and cause it to follow an outline of a drawing or pattern, and a housing through which said sleeve and shaft extend and which houses at least part of said means, said housing being of such size and location as to so obscure the traction wheel that its orientation cannot be readily observed by the operator, the improvement which comprises a cylindrical member coaxial with and secured to the upper portion of the sleeve above said housing where it may be readily seen by the operator and where it moves progressively by a reference place when it turns with the sleeve, and markings on said cylindrical member to indicate the orientation of the traction wheel at any given time by the particular marking or markings which are at said reference place at such time.

3. A photo-electric tracer adapted to follow a pattern and comprising a housing that extends close to the pattern for shielding the pattern from extraneous light, a traction wheel extending from the housing in a position to contact with the pattern at a region of the pattern shielded by the housing, an axle for the traction wheel, a frame for turning the axle to steer the traction wheel, said frame being covered by the housing and rotatable with respect to the housing, an indicator element including a generally circular scale in the housing connected with the frame and rotatable with movements of the frame to steer the traction wheel, and a window in the housing through which the scale is visible for indicating the direction in which the traction wheel is in position to move.

4. A tracing device including a tracer wheel that runs on a support, a housing above and around the tracer wheel and located in position to shut off the view of the wheel from an operator of the tracing apparatus, an axle for the wheel, a frame to which the axle is connected, means for turning the frame with respect to the tracer housing for changing the direction of travel of the tracer, a window in a part of the housing in position to be seen by an operator using the tracing device, an indicator in the housing immediately behind the window, legends on the indicator in position to become successively visible through the window as the indicator turns, and connecting means for turning the indicator through angles similar to those turned by the frame to steer the tracer wheel.

5. A tracing device including a wheel that runs on a surface, a frame connected with the wheel and rotatable about an axis substantially normal to said surface for steering the direction of travel of the wheel across said surface, a rotatable element that is connected with the frame and that rotates with said frame, and numerals around the periphery of the rotatable element, said numerals increasing in a counterclockwise direction around the entire angular extent of the rotatable element.

6. A tracing device including a tracer wheel that rolls on a surface, an axle for the wheel, a frame that holds the axle, a bearing in which the frame rotates to steer the tracer wheel in any and changing directions across said surface, a direction indicator comprising an element connected with the frame so as to make angular movements similar to those of said frame when steering the tracer wheel, and angularly spaced numerals from one to twelve on the rotatable element with the numerals located so that they increase in a counterclockwise direction around said element and with the location of the respective numerals so correlated with the position of the tracer wheel axle that the particular numeral of the direction indicator in front of an observer corresponds to that of your designation of a clock face toward which the tracer would move if located at the center of the clock face and with the numeral six of the clock face nearest the observer.

WALTER BEGEROW.

REFERENCES CITED

The following references are of record in the file of this patent:

UNITED STATES PATENTS

| Number | Name | Date |
|---|---|---|
| 1,166,680 | Hanson | Jan. 4, 1916 |
| 1,901,254 | Messer | Mar. 14, 1933 |
| 2,336,581 | Young | Dec. 14, 1943 |
| 2,349,954 | Geibig | May 30, 1944 |
| 2,349,955 | Johnson | May 30, 1944 |

Certificate of Correction

May 3, 1949.

Patent No. 2,468,802.

WALTER BEGEROW

It is hereby certified that errors appear in the printed specification of the above numbered patent requiring correction as follows:

Column 2, line 54, for the word "ground" read *around*; column 7, line 4, claim 6, for "that of your" read *that your*;

and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*